United States Patent

Kitajima et al.

[11] Patent Number: 5,067,804
[45] Date of Patent: Nov. 26, 1991

[54] MICROSCOPE

[75] Inventors: Nobuaki Kitajima; Kazutoshi Takagi, both of Tokyo, Japan

[73] Assignee: Kabushiki Kaisha Topcon, Tokyo, Japan

[21] Appl. No.: 549,181

[22] Filed: Jul. 5, 1990

[30] Foreign Application Priority Data

Jul. 6, 1989 [JP] Japan .................................. 1-175299

[51] Int. Cl.⁵ ........................ G02B 21/00; G02B 21/36
[52] U.S. Cl. .................................... 359/369; 359/363; 359/376
[58] Field of Search ............................... 350/500–502, 350/507–536, 574–576, 130–143; 358/88–93

[56] References Cited

U.S. PATENT DOCUMENTS

| 4,594,608 | 6/1986 | Hatae et al. | 350/502 |
| 4,786,154 | 11/1988 | Fantone et al. | 350/508 |
| 4,856,873 | 8/1989 | Kleinberg | 350/502 |
| 4,897,537 | 1/1990 | Miyamoto et al. | 350/507 |

FOREIGN PATENT DOCUMENTS 2429076  1/1976  Fed. Rep. of Germany ...... 350/508

Primary Examiner—Bruce Y. Arnold
Assistant Examiner—Thong Nguyen
Attorney, Agent, or Firm—Finnegan, Henderson, Farabow, Garrett, & Dunner

[57] ABSTRACT

A microscope capable of freely moving an objective optical system and an ocular optical system thereof. The microscope includes a TV camera with a light-receiving surface at an image forming position of the objective optical system and a display, wherein the image is taken by the TV camera and transmitted to the display, the transmitted image is displayed in the display, and the displayed image is observed by the ocular optical system of the microscope.

9 Claims, 5 Drawing Sheets

5,067,804

MICROSCOPE

BACKGROUND OF THE INVENTION

1. Field of the Invention

This invention relates to a microscope adapted for use in surgery, for example.

2. Description of the Prior Art

Heretofore, there has been a microscope for magnifying a diseased part and observing it stereoscopically in surgery.

FIG. 5 is a schematic view showing the construction of a conventional microscope. This microscope comprises a first objective optical system 1 and a second objective optical system 2, and a first ocular optical system 3 and a second ocular optical system 4. The first ocular optical system 3 includes an eyepiece 3a and the second ocular system 4 includes an eyepiece 4a. The first objective optical system 1 includes an objective lens 5, an image-formation lens 6, an erecting prism 7, and a reflecting prism 8, and the second objective optical system 2 includes the objective lens 5, an image-formation lens 9, an erecting prism 10, a reflecting prism 11. Additionally, each of the objective optical systems 1, 2 includes a focussing lens (not shown).

In the conventional microscope constituted as mentioned above, image I1, I2 are formed in space by the first and the second objective optical systems 1,2 respectively, and magnified and observed by the ocular optical systems 3, 4, respectively.

In other words, the conventional microscope has optical coupling between the first and second objective optical systems 1, 2, respectively, and the first and second ocular optical systems 3, 4, respectively.

The optical coupling consequently yields a mechanical coupling between an objective lens barrel B which is constituted by the first and second objective optical systems 1, 2, and eyepiece barrels T1, T2 which are constituted by the first and second ocular optical systems 3, 4, as shown in FIG. 6. A length a between the eyepiece-barrels 3a, 4a and the objective lens 5 of the objective lens barrel B is fixed, and focussing is adjusted by a focussing lens (not shown). An observed part P (the diseased part, for example) can be well focussed by the focussing lens even though a working distance L between the objective lens 5 and the observed part P is determined arbitrarily. The working distance L is set by moving the lens barrel B up or down by rotating an arm A.

However, the long working-distance L is required because sufficient working-space required for surgery makes an operating distance M between the eyepiece 3a, 4a and the observed part P long. Because the object lens barrel B is mechanically coupled with the eyepiece barrels T1, T2, moving the object lens-barrel B upwardly away from the observed part P by rotating the arm A makes the eyepiece-barrels T1, T2 move upwardly at the same time. The long operating-distance M would cause the observer to make unnatural motions. In an extreme case, the observer's hands cannot reach the observed part P.

On the other hand, there has been a problem that the short operating-distance M by moving the lens-barrel B downwardly toward the observed part P due to the observer's small physique, for example, results in the short working-distance L, which would in turn cause the lens barrel B to obstruct surgical operations.

SUMMARY OF THE INVENTION

An object of the present invention is to provide a microscope which facilitates the observation of a diseased part during surgical operation where the working distance between the objective optical system of the microscope and the diseased part is optionally determined, without causing the operator to make unnatural motion.

Another object of the present invention is to provide a microscope which is capable of moving the objective optical system and the ocular optical system of the microscope to optional positions.

According to one feature of the present invention, the microscope includes an image-taking means including a light-receiving surface at a position where an image of the diseased part is formed by an objective optical system of the microscope, and a display means for displaying the image taken by the image-taking means, wherein the image displayed in the display means is observed by an ocular optical system of the microscope.

According to another feature of the present invention, the microscope includes first and second image-taking means each including a light-receiving surface at a position where an image of the diseased part is formed by a respective one of a first and a second objective optical system of the microscope, and first and second display means for displaying the image taken by a respective one of the first and second image-taking means, wherein the images displayed in the first and second display means are observed by a respective one of first and second ocular systems of the microscope.

According to yet another feature of the means for transmitting a wireless signal representing a monitored image of an object to be observed by the microscope (e.g., a diseased part), means coupled to and detached from the transmitting means for receiving the wireless signal, means coupled to the receiving means for displaying the monitored image of the object, and an ocular optical system coupled to the displaying means for observing the monitored image of the object.

DESCRIPTION OF THE PREFERRED EMBODIMENT

The embodiment of the invention will be described hereinafter with reference to the accompanying drawings.

Figure 1:
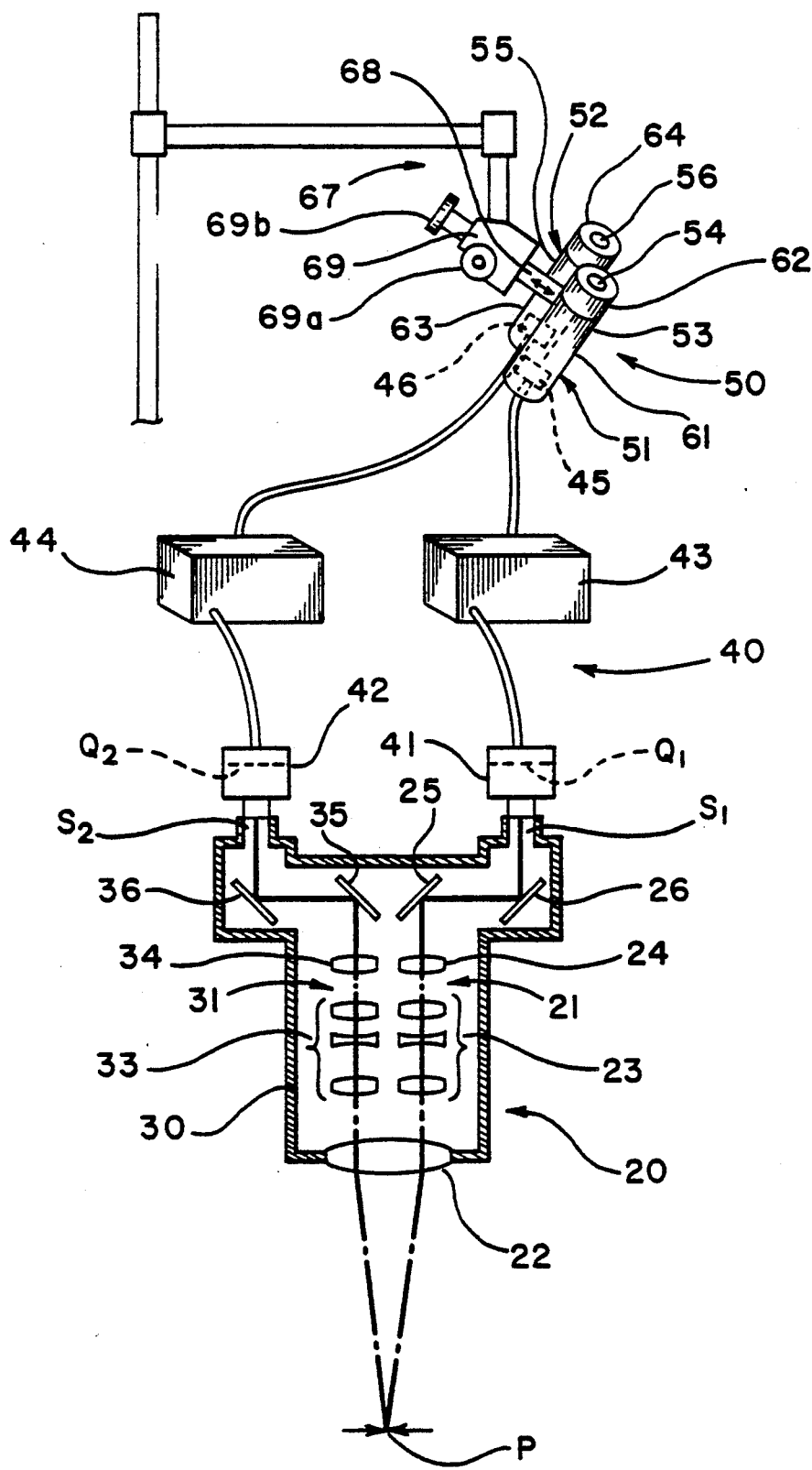
FIG. 1 is a schematic view showing the construction of a stereomicroscope according to a first embodiment of the present invention.

FIG. 1 is a schematic view showing the construction of a stereomicroscope including an objective system 20, an image processing system 40, an ocular system 50, etc.

The objective system 20 includes a first objective optical system 21 and a second objective optical system 31 mounted inside an objective lens-barrel 30 held by an arm (not shown). The first objective optical system 21 includes a objective lens 22 facing the diseased part P, a variable power lens 23, an image-formation lens 24, and reflecting mirrors 25, 26. The second objective system 31 includes an objective lens 22, a variable power lens 33, an image-formation lens 34, and reflecting mirrors 35, 36.

The image of the diseased part P is formed by the first and second objective optical systems 21, 31 at positions Q1, Q2, respectively, above exit windows S1, S2, respectively, mounted in the upper parts of the objective lens-barrel 30.

A picture image processing system 40 includes light-receiving surfaces at the positions Q1, Q2, TV cameras 41, 42 (as image-taking means) mounted in the exit windows S1, S2, respectively, picture image processing devices 43, 44 for recording or displaying the images taken by the TV cameras 41, 42, respectively, and displays 45, 46 for displaying the images displayed by the processing devices 43, 44, respectively. The displays 45, 46 include liquid crystal displays.

An ocular system 50 includes a first ocular optical system 51 with an eyepiece 54 mounted in an eyepiece-barrel 53, and a second ocular optical system 52 with an eyepiece 56 mounted in an eyepiece-barrel 55.

The displays 45, 46 are mounted on the optical axes of the eyepieces 54, 56, respectively, inside the eyepiece-barrels 53, 55, respectively, so that the images displayed at the displays 45, 46 can be observed stereoscopically by the eyepieces 54, 56.

Figure 2:
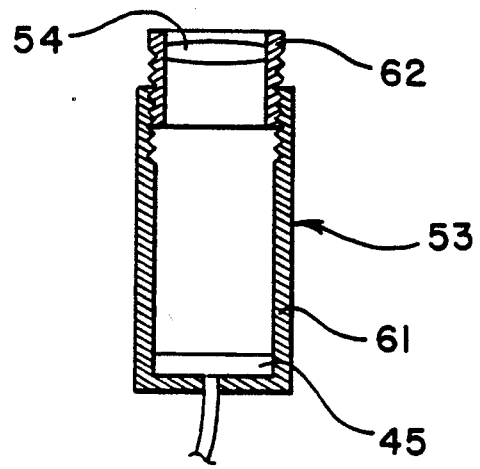
FIG. 2 is a sectional view of an eyepiece-barrel.

As shown in FIG. 2, the eyepiece-barrel 53 includes an outer barrel 61 and an inner barrel 62. The inner barrel 62 is screwed into the inner surface of the outer barrel 61 and has an eyepiece 54 mounted inside thereof. The eyepiece 54 can move along the optical axis thereof by rotating the inner barrel 62 to focus the image displayed at the display 45 according to the diopter of the operator. Likewise, the eyepiece-barrel 55 includes outer and inner barrels 63, 64, respectively.

Figure 3:
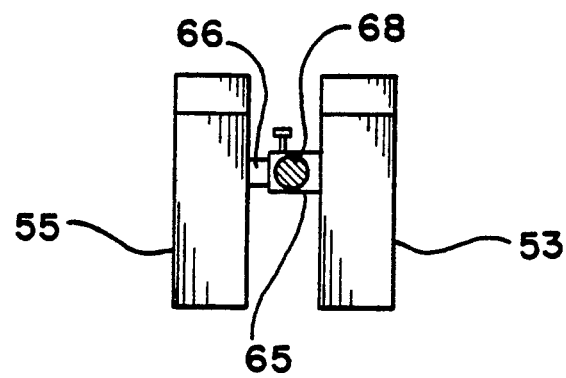
FIG. 3 is a plan view of the eyepiece-barrels of FIG. 2.

Referring to FIG. 3, the eyepiece-barrels 53 and 55 have a barrel-like connecting shaft 65 and a connecting shaft 66 respectively. The connecting shaft 68 is inserted into the barrel-like connecting shaft 65 to couple the eyepiece-barrels 53 and 55 to one another. The distance between the axes of the eyepiece-barrels 53, 55 can be adjusted by adjusting the length of the shaft 66 inside the shaft 65. In other words, the shafts 65, 66 can be used to adjust the distance between the optical axes of the eyepiece barrels 53, 55.

Referring back to FIG. 1, the shaft 65 is connected to the head of a shaft 68 for connecting a body 69 to an arm 67. The body 69 can move back and forth along the arrow by turning a dial 69a. The eyepiece-barrels 53, 55 can change the direction by rotating the shaft 68 by turning a dial 69b, and move freely omni-directionally by moving the arm 67.

Figure 6:
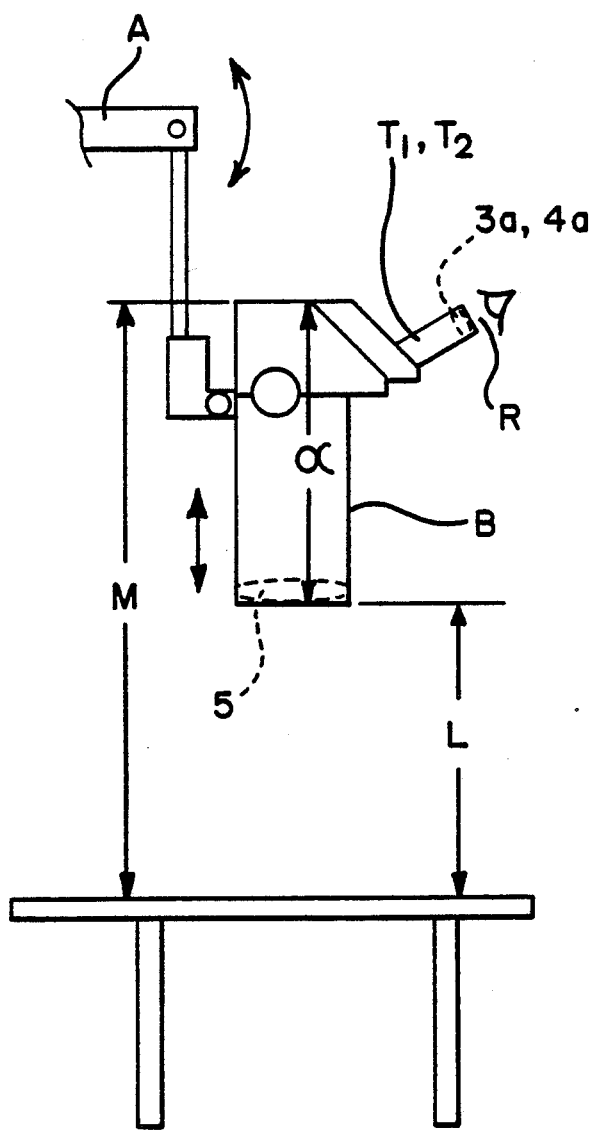
FIG. 6 is a schematic view showing a configuration of the conventional stereomicroscope of FIG. 5.

The ocular system 50, as mentioned above, is neither optically nor mechanically connected to the objective system 20 because the images of the diseased part P formed by the first and the second objective optical systems 21, 31 are taken by the TV cameras 41, 42, and then displayed in the displays 45, 46, and finally observed stereoscopically by the eyepieces 54, 56. Accordingly, the eyepiece-barrels 53, 55 can be set at the best position regardless of the movement of the objective lens-barrel 30 and the working distance L. Since the objective lens-barrel 30 and the eyepiece-barrels 53, 55 can be moved freely, observation of the diseased part can be carried out as usual, and the observer can perform surgical operations without making unnatural motions regardless of the working distance L (shown in FIG. 6).

In this embodiment, the images of the diseased part P taken by the TV cameras 41, 42 can be recorded as well as displayed in the displays 45, 46, and consequently it is not necessary to split the luminous flux from the diseased part P into two for observing and recording. Illuminants for illuminating the diseased part P can be effectively used.

Weight saving in the apparatus can be realized because the free movement of the eyepiece-barrels 53, 55 regardless of the position of the objective system 20 dispenses with devices such as prisms, mirrors. The ability to display various data such as blood pressure, heart rate, temperature, breath rate, and brain waves beside the image of the diseased part P in the displays 45, 46 is very useful for surgical operations. Picking up the image of the diseased part P by the TV cameras 41, 42 enable the image to be observed with invisible rays.

Figure 4:
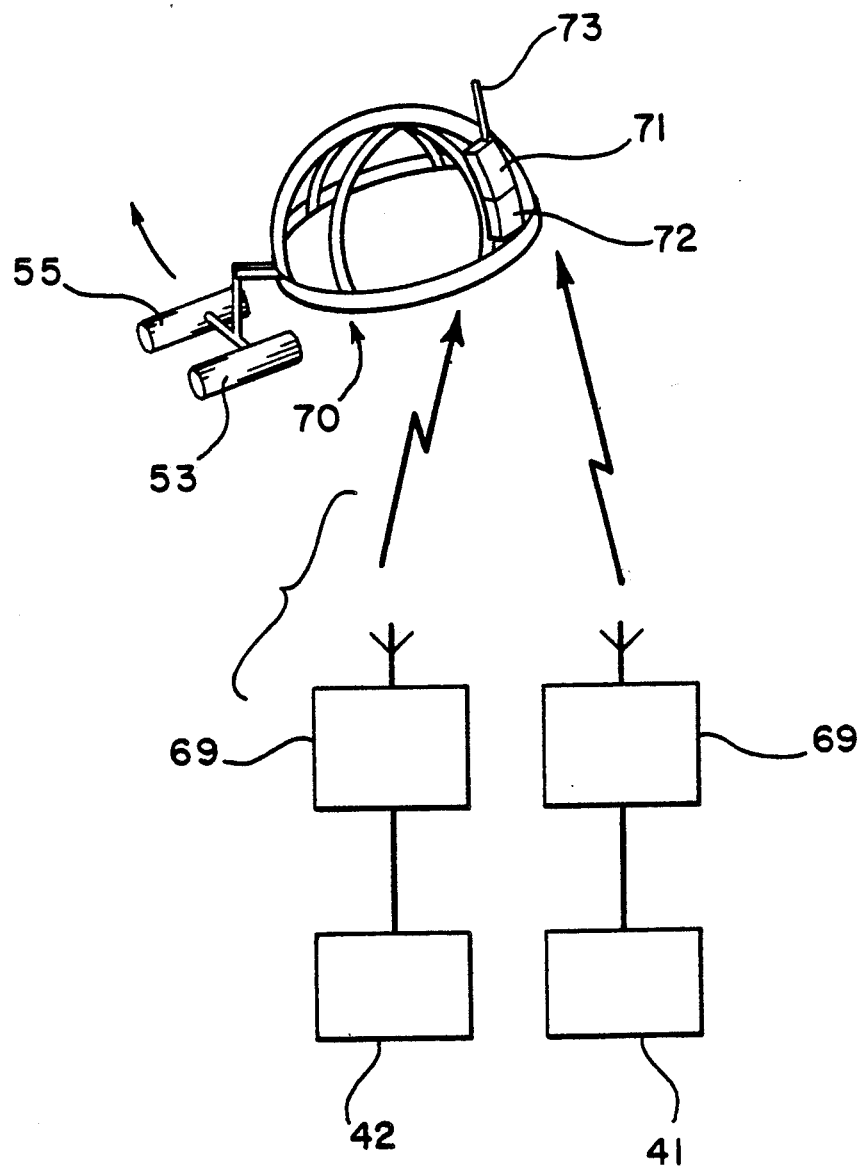
FIG. 4 is a schematic view showing the construction of a stereomicroscope according to a second embodiment of the present invention.
Figure 5:
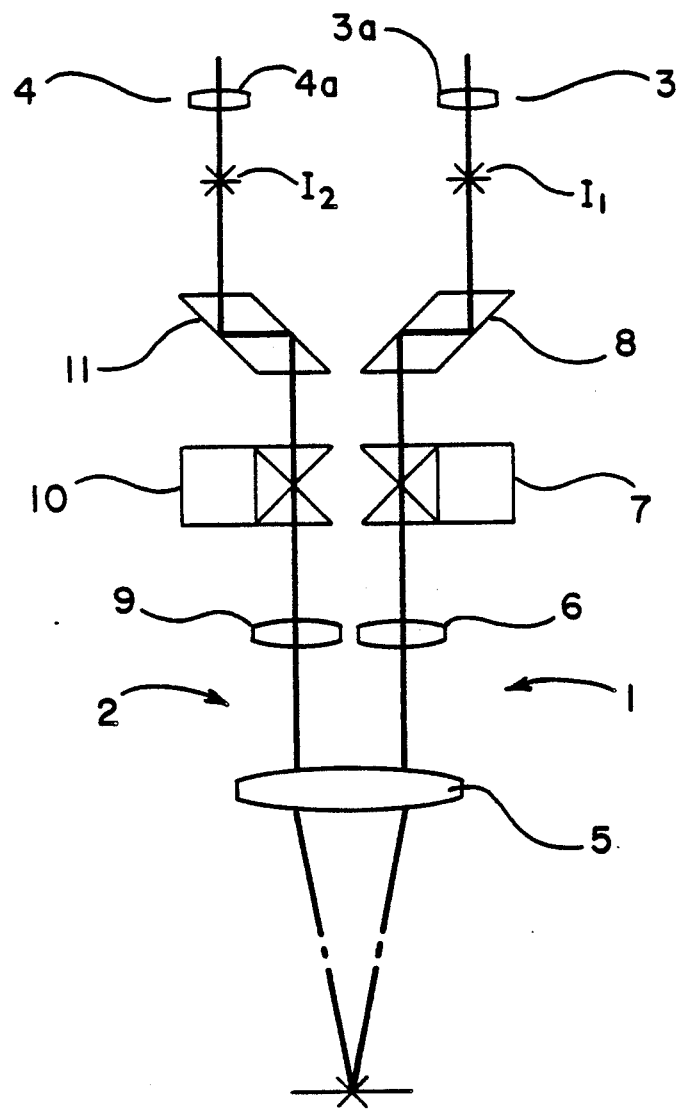
FIG. 5 is a schematic view showing an arrangement of the optical system of a conventional stereomicroscope.

Referring to FIG. 4 which shows the second embodiment of the present invention, a belt cap 70, to be worn on the operator's head includes the eyepiece-barrels 53, 55 and a receiver (receiving means) 71. The direction of the eyepieces-barrels 53, 55 is changeable along the direction of the arrow shown in the figure as the occasions demand. The numerals 72, 73 designate a battery and a receiving antenna respectively.

In this second embodiment, the images taken by the TV cameras 41, 42 are transmitted by transmitters 69, and the transmitted signals are received by a receiver 71 and successively the images taken by the cameras are displayed in the displays 45, 46.

Cords linking the TV cameras 41, 42 to the displays 45, 46, respectively, can obstruct observation of the diseased part of the operation, and therefore, are dispensed within the second embodiment.

The present invention can be applied to an ordinary monocular microscope as well as a microscope for observing the diseased part microscopically or to some microscope except one in surgery, as a matter of course.

What is claimed is:

1. A microscope for observing an object, comprising:
   an objective lens-barrel including:
   an objective optical system for forming an image of said object, and
   means having a light receiving surface for monitoring a formed image; and
   one or more eyepiece-barrels detached from said objective lens-barrel and movable independently thereof, said eyepiece-barrels including:
   means, coupled to said monitoring means, for displaying an image representing a monitored image of the object, and
   an ocular optical system for projecting a displayed image for observation by the user of said microscope.

2. A microscope according to claim 1, wherein said displaying means includes a liquid crystal display.

3. A microscope for observing an object comprising:
   an objective lens-barrel including:
   an objective optical system for forming an image of said object,
   means having a light-receiving surface for monitoring a formed image, and means for transmitting wireless a signal representing a monitored image; and one or more eyepiece-barrels, detached from said objective lens-barrel and movable independently thereof, said eyepiece-barrels including:

means, coupled to said transmitting means, for receiving a transmitted signal, means for displaying an image representing said transmitted signal, and an ocular optical system for projecting a displayed image for observation by the user of said microscope.

4. A microscope according to claim 1 or claim 3, wherein said displaying means including means for displaying data associated with surgical operations.

5. A microscope for observing an object, comprising:
an objective lens-barrel including:

a first objective optical system for forming a first image of said object, a second objective optical system for forming a second image of the object, a first means having a light-receiving surface, coupled to said first objective optical system, for monitoring said first image, and a second means having a light-receiving surface, coupled to said second objective optical system, for monitoring said second image; and one or more eyepiece-barrels, detached from said objective lens-barrel and movable independently thereof, said eyepiece-barrels including:

a first means, coupled to a respective one of said first and second monitoring means, for displaying an image representing a respective one of monitored first and second images of the object, a second means, coupled to a respective on of said first and second monitoring means, for displaying an image representing a respective one of monitored first and second images of the object, a first ocular optical system, coupled to said first displaying means, for projecting a displayed image for observation by the user of said microscope, and a second ocular optical system, coupled to said second displaying means, for projecting a displayed image for observation by the user of said microscope.

6. A microscope according to claim 5, further comprising means, coupled to said first and second ocular optical systems, for adjusting a distance between the optical axes of said first and second ocular optical systems.

7. A microscope for observing an object, comprising:
an objective lens-barrel including:

a first objective optical system for forming a first image of said object, a second objective optical system for forming a second image of the object, a first means having a light-receiving surface, coupled to said first objective optical system, for monitoring said first image, a second means having a light-receiving surface, coupled to said second objective optical system, for monitoring said second image, and means, coupled to said first and second monitoring means, for transmitting wireless a signal representing monitored first or second image; and one or more eyepiece-barrels, detached from said objective lens-barrel and movable independently thereof, said eyepiece-barrels including:

means, coupled to said transmitting means, for receiving a transmitted signal, a first means, coupled to said receiving means, for displaying an image representing a received signal representing a respective one of said monitored first and second images, a second means, coupled to said receiving means, for displaying an image representing a received signal representing a respective one of said monitored first and second images, a first ocular optical system, coupled to said first displaying means, for projecting a displayed image for observation by the user of said microscope, and a second ocular optical system, coupled to said second displaying means, for projecting a displayed image for observation by the user of said microscope.

8. A microscope according to claim 5 or claim 7, wherein at least one of said first and second displaying means includes means for displaying data associated with surgical operations.

9. A microscope according to claim 5 or claim 7, wherein each of said first and second display means includes a liquid crystal display.

* * * * *